UNITED STATES PATENT OFFICE.

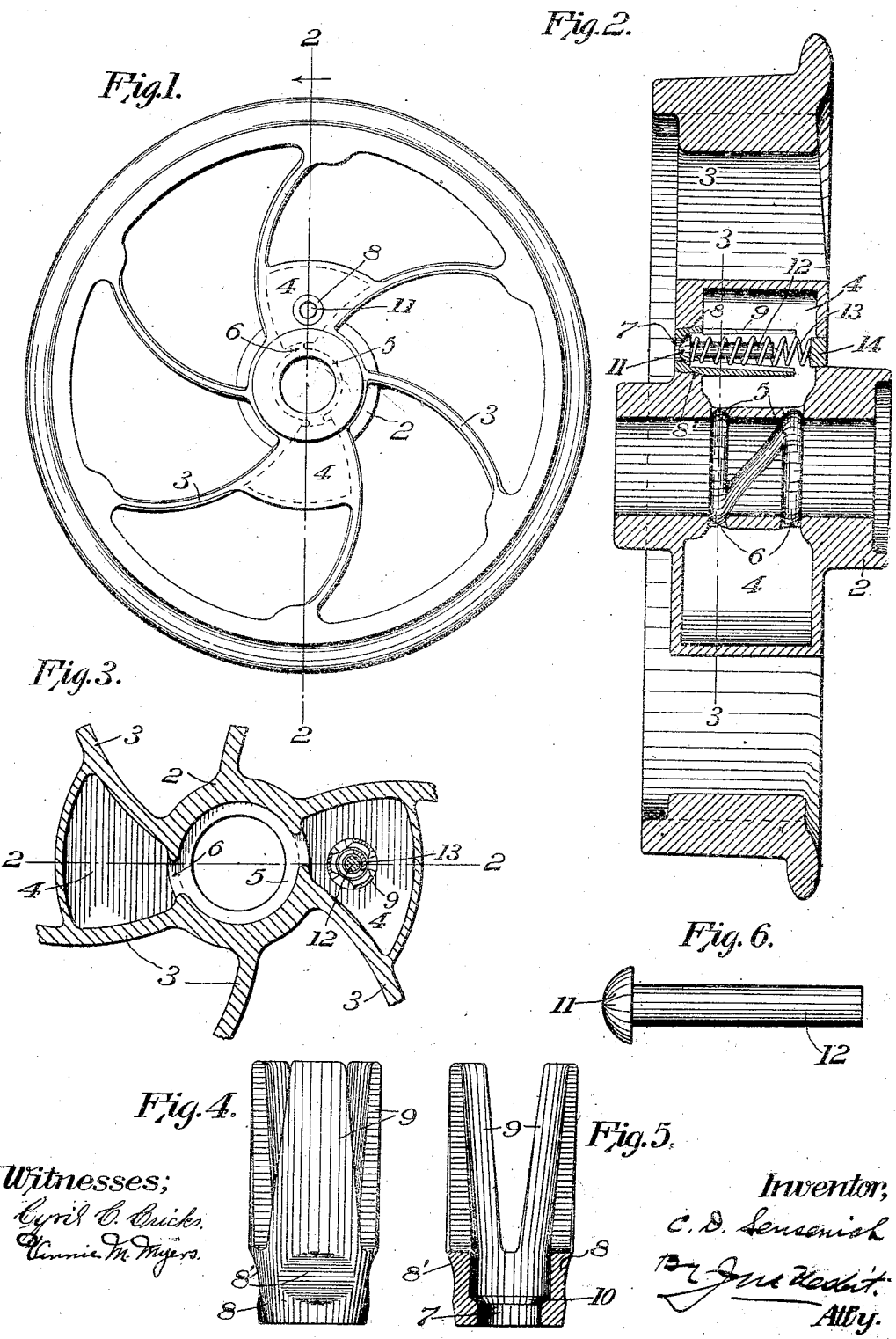

CHESTER D. SENSENICH, OF IRWIN, PENNSYLVANIA, ASSIGNOR TO IRWIN FOUNDRY & MINE CAR COMPANY, OF IRWIN, PENNSYLVANIA, A CORPORATION OF PENNSYLVANIA.

SELF-LUBRICATING WHEEL.

No. 896,592.   Specification of Letters Patent.   Patented Aug. 18, 1908.

Application filed November 9, 1904. Serial No. 231,991.

*To all whom it may concern:*

Be it known that I, CHESTER D. SENSENICH, a citizen of the United States, residing at Irwin, in the county of Westmoreland and State of Pennsylvania, have invented certain new and useful Improvements in Self-Lubricating Wheels, of which the following is a specification, reference being had therein to the accompanying drawings.

This invention relates to that type of self lubricating wheel which is provided with an oil chamber from which the lubricant feeds to the wheel journal, and the object is to provide a closure of improved construction for the filling opening of the oil chamber.

In the accompanying drawings, Figure 1 is a face view of a wheel constructed in accordance with my invention, and Fig. 2 is an enlarged sectional view, taken on line 2—2 of Fig. 1. Fig. 3 is a sectional view taken on line 3—3 of Fig. 2. Figs. 4, 5 and 6 are detail views of the valve-cage and valve.

Referring to the drawings, 2 designates the wheel hub and 3 the spokes, with opposite oil chambers 4 located between and cast integral with adjacent spokes and with the hub. The eye of the hub is grooved at 5, with said grooves opening into the oil chambers at 6, whereby the oil may flow freely around the axle (not shown) from one chamber to the other and thus maintain the axle thoroughly lubricated.

The construction thus far described is old and well known in the art, as well as various modifications thereof. The number, location and form of the oil chambers are unessential details, although I prefer to employ two chambers which are arranged opposite each other as shown so that the oil will flow freely from one to the other. One filling opening is sufficient, although each of the chambers may be so equipped if desired.

In the present embodiment of the invention the filling opening 7, located preferably in the outer side wall of one of chambers 4, is formed through the outer tubular end 8 of the open valve-cage 9 which extends into the chamber, said tubular end 8 being secured in and extending through the chamber wall, as shown, the chamber being preferably cast therearound. A valve-seat 10 at the inner end of opening 7 is adapted to receive the rounded valve head 11 having stem 12 which projects into cage 9. The valve head and stem may be conveniently formed of an ordinary headed rivet. A coiled spring 13 holds the valve normally seated and the filling opening closed. The valve and spring are inserted through an opening in the opposite wall of chamber 4, the opening being closed by plug 14.

The cage operates to hold the valve against lateral displacement and is so shaped as to direct it to its seat. The inner end of the cage is entirely open and the sides thereof are slitted or of prong-like form, thus providing a free and open passage for the thick or heavy oil commonly used for lubricating this type of wheel and avoiding danger of the cage and valve becoming clogged. The valve may be readily pressed inward by the spout of an oil can and thus opened for the admission of oil, the valve closing automatically as soon as the oiler is withdrawn. The valve mechanism is entirely within the oil chamber and hence completely protected.

I claim:—

1. A self oiling car wheel having a hub oil chamber with an oil inlet through one wall, a valve guide having an opening and valve seat at its outer end, said guide being permanently fixed in said wall at said oil inlet and extending therefrom inwardly into said chamber and open at its inner end, a valve in said permanently fixed guide and insertible thereinto through said inner end opening, and a valve-seating spring seated against a wall of said chamber and extending into said guide through said inner end opening thereof, said chamber being formed with an opening for entering said valve and spring into said previously permanently fixed guide through its inner open end.

2. A self oiling wheel provided with an oil chamber having a filling opening, a valve-cage extending into the chamber from the filling opening, the cage being open at its inner end and having slitted or prong-like sides, an inwardly opening valve operative within the cage for normally closing the filling opening, and a valve-holding spring.

3. A self oiling wheel provided with an oil chamber having a filling opening in one side thereof, a valve-cage within the oil chamber and extending from the filling opening toward but stopping short of the opposite wall of the chamber, the cage being open laterally and at its inner end, an inwardly opening valve within the cage, and a coiled spring extending through the inner open end of the cage and engaging said opposite wall of the chamber and the valve for holding the latter normally in closed position.

4. A self-oiling wheel having an oil-chamber formed with an opening, a valve-cage extending into the chamber and having a tubular end-portion fitting the chamber opening, the cage being open at its inner end and having its sides slotted from said end toward the tubular end, the interior of the cage tapering toward said tubular end, a valve, and a spring within the cage for holding the valve normally seated and closing said tubular cage-end.

5. A self oiling car wheel having a chambered hub with an oil inlet through one wall, a valve seat consisting of a pronged guiding seat cast in said wall adjacent to said inlet, a valve, and a spring bearing against said valve and seating against the opposite side of the cavity.

6. A self oiling car wheel having a hub oil chamber with an oil inlet through a wall thereof, a valve cage having an open inner end and a reduced outer end opening forming an internal valve seat, said cage being permanently cast at its outer end in said wall in continuation of said oil inlet, and extending into said chamber with its open inner end spaced from an opposite chamber wall, a valve in said cage insertible through said inner end thereof, and a valve-seating spring seating against said opposite wall and entering said cage through the open inner end of the latter.

7. A self oiling car wheel having a hub oil chamber with an oil inlet through a wall thereof, a valve guide in said chamber formed for the passage of oil therethrough and having an outer end opening, an internal valve seat and an inner end opening, said guide at its outer end being permanently cast in said wall in inward continuation of said oil inlet, a valve in said guide insertible through said inner open end thereof, and a valve-seating spring in said cage and insertible through said inner open end thereof, said chamber being formed to permit insertion of said spring and valve thereinto and into the open inner end of said guide, after the chamber has been cast with the guide therein.

8. A self-oiling wheel having an oil chamber provided with a filling opening, a valve cage open at its ends and secured within the chamber and forming an inward continuation of the filling opening, the wall of the chamber opposite the filling opening having a normally closed opening of a size to admit of the passage therethrough of a valve and a spring, an inwardly opening valve seating within the cage and closing the filling opening, and a spring holding the valve normally seated.

In testimony whereof I affix my signature in presence of two witnesses.

CHESTER D. SENSENICH.

Witnesses:
 LOUIS S. MALONE,
 J. B. GALLAGHER.